(12) United States Patent
Cho

(10) Patent No.: US 12,036,970 B2
(45) Date of Patent: Jul. 16, 2024

(54) DEVICE AND METHOD FOR AVOIDING A REAR COLLISION IN PLATOONING OF A TRAILER VEHICLE

(71) Applicants: HYUNDAI MOTOR COMPANY, Seoul (KR); KIA CORPORATION, Seoul (KR)

(72) Inventor: Jae Seol Cho, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 224 days.

(21) Appl. No.: 17/498,452

(22) Filed: Oct. 11, 2021

(65) Prior Publication Data

US 2022/0176925 A1 Jun. 9, 2022

(30) Foreign Application Priority Data

Dec. 9, 2020 (KR) .......................... 10-2020-0171732

(51) Int. Cl.
| | |
|---|---|
| *B60T 8/00* | (2006.01) |
| *B60T 8/17* | (2006.01) |
| *B60T 8/1755* | (2006.01) |
| *B62D 53/08* | (2006.01) |
| *G08G 1/00* | (2006.01) |
| *G08G 1/16* | (2006.01) |

(52) U.S. Cl.
CPC ........ *B60T 8/17558* (2013.01); *B60T 8/1708* (2013.01); *B62D 53/0871* (2013.01); *G08G 1/166* (2013.01); *G08G 1/22* (2013.01); *B60T 2210/20* (2013.01); *B60T 2250/03* (2013.01)

(58) Field of Classification Search
CPC ... B60T 8/17558; B60T 8/1708; G08G 1/166; G08G 1/22
See application file for complete search history.

(56) References Cited

U.S. PATENT DOCUMENTS

2018/0210464 A1* 7/2018 Switkes ................. G08G 1/163

* cited by examiner

*Primary Examiner* — Tiffany P Ohman
(74) *Attorney, Agent, or Firm* — Lempia Summerfield Katz LLC

(57) ABSTRACT

A device and a method for controlling collision avoidance of a trailer vehicle in platooning include a jackknife induction determination module or operation that determines whether to execute jackknife induction control in a leading vehicle when an emergency braking situation occurs during platooning of the trailer vehicle. The device and method also include a jackknife induction control module or operation that provides an additional braking distance of a following vehicle at the rear of a tractor by inducing pivoting of a trailer while controlling the tractor and trailer of the leading vehicle, respectively, to allow a jackknife phenomenon to occur. Stability of the platooning is improved by reducing a possibility of the occurrence of a collision accident by the following vehicle even during emergency braking.

20 Claims, 9 Drawing Sheets

DEVICE AND METHOD FOR AVOIDING A REAR COLLISION IN PLATOONING OF A TRAILER VEHICLE

CROSS-REFERENCE TO RELATED APPLICATION

This application claims the benefit of priority to Korean Patent Application No. 10-2020-0171732, filed in the Korean Intellectual Property Office on Dec. 9, 2020, the entire contents of which are incorporated herein by reference.

TECHNICAL FIELD

The present disclosure relates to a device and a method for avoiding a collision of a trailer vehicle in platooning that may prevent a collision caused because an inter-vehicle distance is insufficient during an emergency stop.

BACKGROUND

In general, in a case of a trailer vehicle traveling in a state in which a tractor and a trailer are coupled to each other by connection between a coupler and a kingpin, a jackknife phenomenon (jackknifing) in which the trailer is bent like a jackknife with respect to the tractor may occur by inertia in an emergency braking situation or a sharp cornering situation.

Such a jackknife phenomenon not only weakens the coupling between the tractor and the trailer, but also may cause a major accident, such as a case in which the bent trailer invades an adjacent lane, a case in which the tractor is dragged and rolled over by a torque of the trailer, or the like.

In particular, the jackknife phenomenon in the emergency braking situation that occurs while a large number of trailer vehicles are platooning may lead to a major accident. Thus, a leading vehicle (LV) in the platooning has been able to prevent the jackknife phenomenon through braking control of an electronic brake system (EBS).

When the leading vehicle in the platooning prevents the jackknife phenomenon from occurring as such, the trailer vehicle may maintain a travel lane, but it is often difficult for following vehicles (FV) in the platooning following the leading vehicle LV to secure a sufficient inter-vehicle distance to avoid a collision in the emergency braking situation caused by an object suddenly sensed in front of the leading vehicle, resulting in a chain reaction collision accident.

SUMMARY

The present disclosure has been made to solve the above-mentioned problems occurring in the prior art while advantages achieved by the prior art are maintained intact.

An aspect of the present disclosure provides a device and a method for controlling collision avoidance of a trailer vehicle in platooning that may include a jackknife induction determination module that determines whether to execute jackknife induction control in a leading vehicle when an emergency braking situation occurs during the platooning of the trailer vehicle. The device and method may also include a jackknife induction control module that provides an additional braking distance of a following vehicle at the rear of a tractor by inducing pivoting of a trailer while controlling the tractor and trailer of the leading vehicle, respectively, to allow a jackknife phenomenon to occur, thereby improving stability of the platooning by reducing a possibility of an occurrence of a collision accident by the following vehicle even during emergency braking.

The technical problems to be solved by the present inventive concept are not limited to the aforementioned problems. Any other technical problems not mentioned herein should be clearly understood from the following description by those having ordinary skill in the art to which the present disclosure pertains.

According to an aspect of the present disclosure, a device for controlling collision avoidance of a trailer vehicle in platooning is provided. The device includes a jackknife induction determination module that determines whether to execute jackknife induction control in a leading vehicle when an emergency braking situation occurs during the platooning of the trailer vehicle with a trailer coupled to a tractor. The device also includes a jackknife induction control module that provides an additional braking distance to a following vehicle at a rear of the tractor by inducing pivoting of the trailer while controlling the tractor and the trailer of the leading vehicle, respectively, to cause a jackknife phenomenon.

In one implementation, the jackknife induction determination module may include a maximum emergency braking device that determines whether to perform maximum emergency braking by comparing an actual distance between a front object and the leading vehicle recognizing a presence of the front object with a minimum braking distance at a time when executing emergency braking of the leading vehicle. The jackknife induction determination model may further include an emergency braking command transmitting device that transmits an emergency braking command from the leading vehicle executing the maximum emergency braking to the following vehicle to induce emergency braking of the following vehicle. The jackknife induction determination module may additionally include a jackknife request receiving device that receives a jackknife execution request for securing the additional braking distance transmitted from the following vehicle to determine to execute the jackknife induction control.

In one implementation, the jackknife induction control module may include a pivoting induction direction determining device that determines a pivoting induction direction by selecting a lane to be entered by the trailer bending by the jackknife phenomenon among lanes on both sides of the leading vehicle in the platooning. The jackknife induction control module may also include a trailer pivoting induction device that reduces a braking force of a trailer braking control valve on a pivoting induced-side to cause a difference in the braking force, thereby inducing pivoting of the trailer in the pivoting induction direction to cause the jackknife phenomenon.

In one implementation, the trailer pivoting induction device may reduce a braking force of a left braking control valve among braking control valves of the trailer to induce pivoting in a clockwise direction when the pivoting induction direction is a direction toward a left lane. The trailer pivoting induction device may also reduce a braking force of a right braking control valve to induce pivoting in a counterclockwise direction when the pivoting induction direction is a direction toward a right lane.

In one implementation, the trailer pivoting induction device may apply a control command for reducing a braking force of a side opposite to the pivoting induced-side to a braking control valve of the tractor to induce pivoting in a direction opposite to the pivoting induction direction of the trailer to the tractor when it is determined that the trailer vehicle is traveling on a straight road.

In one implementation, the jackknife induction control module may further include a tractor monitoring device that performs control to maintain a turning range of the tractor within a limit yaw rate range by reducing a difference in a braking force of the tractor when a sensed yaw rate indicating a turning degree of the tractor is out of the preset limit yaw rate range.

In one implementation, the tractor monitoring device may reduce the difference in the braking force by increasing a braking force of a braking control valve on a side where the braking force was reduced and decreasing a braking force of a braking control valve on a side where the braking force was maintained when the sensed yaw rate deviates from the limit yaw rate range.

In one implementation, the jackknife induction control module may further include a trailer pivoting monitoring device that performs control to maintain a pivoting angle of the trailer within a required pivoting angle range by reducing the difference in the braking force applied to the braking control valves of the trailer when the pivoting angle of the trailer is beyond the preset required pivoting angle range.

In one implementation, the trailer pivoting monitoring device may increase the braking force on the pivoting induced-side where the braking force was reduced to induce the pivoting of the trailer and may reduce a braking force on a side opposite to the pivoting induced-side where a braking force during the emergency braking was maintained to reduce a pivoting degree of the trailer.

In one implementation, the jackknife induction control module may further include a feedback controller that controls braking forces of braking control valves of the tractor and the trailer to increase or decrease such that a sensed yaw rate of the tractor measured by a yaw rate sensor is maintained within a preset limit yaw rate range until the trailer vehicle stops, and such that a pivoting angle of the trailer measured based on an image filmed by a cab rear camera is maintained within a preset range of a required pivoting angle.

In one implementation, the feedback controller may perform control to reduce a difference in the braking force of the tractor when the sensed yaw rate increases beyond the limit yaw rate range and to increase the difference in the braking force when the sensed yaw rate decreases to be below the limit yaw rate range. The feedback controller may also perform control to reduce the difference in the braking force of the trailer when the pivoting angle of the trailer increases to be equal to or higher than the required pivoting angle and to increase the difference in the braking force when the pivoting angle of the trailer decreases to be equal to or lower than the required pivoting angle.

According to another aspect of the present disclosure, a method for controlling collision avoidance of a trailer vehicle in platooning is provided. The method includes a jackknife induction determination operation for determining whether to execute jackknife induction control in a leading vehicle when an emergency braking situation occurs during the platooning of the trailer vehicle with a trailer coupled to a tractor. The method also includes a jackknife induction control operation for providing an additional braking distance to a following vehicle at the rear of the tractor by inducing pivoting of the trailer while controlling the tractor and the trailer of the leading vehicle, respectively, to cause a jackknife phenomenon when it is determined to execute the jackknife induction control.

In one implementation, the jackknife induction control operation may include a pivoting induction direction determining process for determining a pivoting induction direction by selecting a lane to be entered by the trailer bending by the jackknife phenomenon among lanes on both sides of the leading vehicle in the platooning. The jackknife induction control operation may also include a trailer pivoting induction process for reducing a braking force of a trailer braking control valve on a pivoting induced-side to cause a difference in the braking force, thereby inducing pivoting of the trailer in the pivoting induction direction to cause the jackknife phenomenon.

In one implementation, the trailer pivoting induction process may include reducing a braking force of a left braking control valve among braking control valves of the trailer to induce pivoting in a clockwise direction when the pivoting induction direction is a direction toward a left lane. The trailer pivoting induction process may also include reducing a braking force of a right braking control valve to induce pivoting in a counterclockwise direction when the pivoting induction direction is a direction toward a right lane.

In one implementation, the trailer pivoting induction process may include applying a control command for reducing a braking force of a side opposite to the pivoting induced-side to a braking control valve of the tractor to induce pivoting in a direction opposite to the pivoting induction direction of the trailer to the tractor when it is determined that the trailer vehicle is traveling on a straight road.

In one implementation, the jackknife induction control operation may further include a tractor monitoring process for performing control to maintain a turning range of the tractor within a limit yaw rate range by reducing a difference in a braking force of the tractor when a sensed yaw rate indicating a turning degree of the tractor is out of the preset limit yaw rate range.

In one implementation, the jackknife induction control operation may further include a trailer pivoting monitoring process for performing control to maintain a pivoting angle of the trailer within a required pivoting angle range by reducing the difference in the braking force applied to the braking control valves of the trailer when the pivoting angle of the trailer is beyond the preset required pivoting angle range.

In one implementation, the jackknife induction control operation may further include a feedback controlling process for performing control to reduce a difference in a braking force of the tractor when a sensed yaw rate increases beyond a limit yaw rate range and to increase the difference in the braking force when the sensed yaw rate decreases to be below the limit yaw rate range. The feedback controlling process may also be for performing control to reduce the difference in the braking force of the trailer when a pivoting angle of the trailer increases to be equal to or higher than a required pivoting angle and to increase the difference in the braking force when the pivoting angle of the trailer decreases to be equal to or lower than the required pivoting angle.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
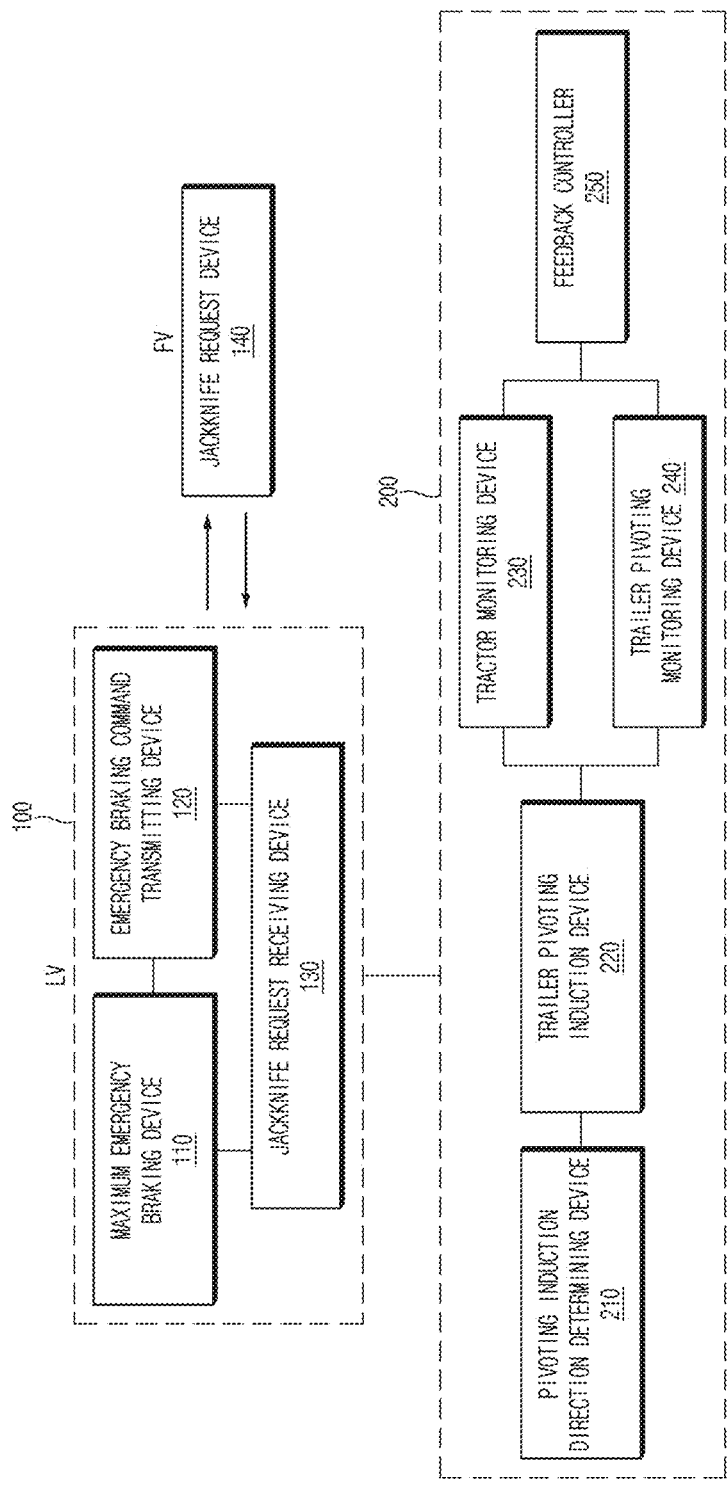
FIG. 1 is a block diagram of a collision avoidance control device of a trailer vehicle in platooning according to the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of the related known configurations or functions has been omitted where it is determined that it would interfere with the understanding of the embodiments of the present disclosure. When a component, device, element, or the like of the present disclosure is described as having a purpose or performing an operation, function, or the like, the component, device, or element should be considered herein as being "configured to" meet that purpose or to perform that operation or function. Further, the various modules, devices, and the like that are disclosed herein may include or be implemented having one or more processors, microprocessors, or computers and may include or be implemented having one or more memories or storages, which may be or include those of a non-transitory type.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one having ordinary skill in the art to which this disclosure belongs. It should be further understood that terms, such as those defined in commonly used dictionaries, are to be interpreted as having a meaning that is consistent with their meaning in the context of the relevant art and should not be interpreted in an idealized or overly formal sense unless expressly so defined herein.

Hereinafter, embodiments of the present disclosure are described in detail with reference to FIGS. 1-9.

Figure 2:
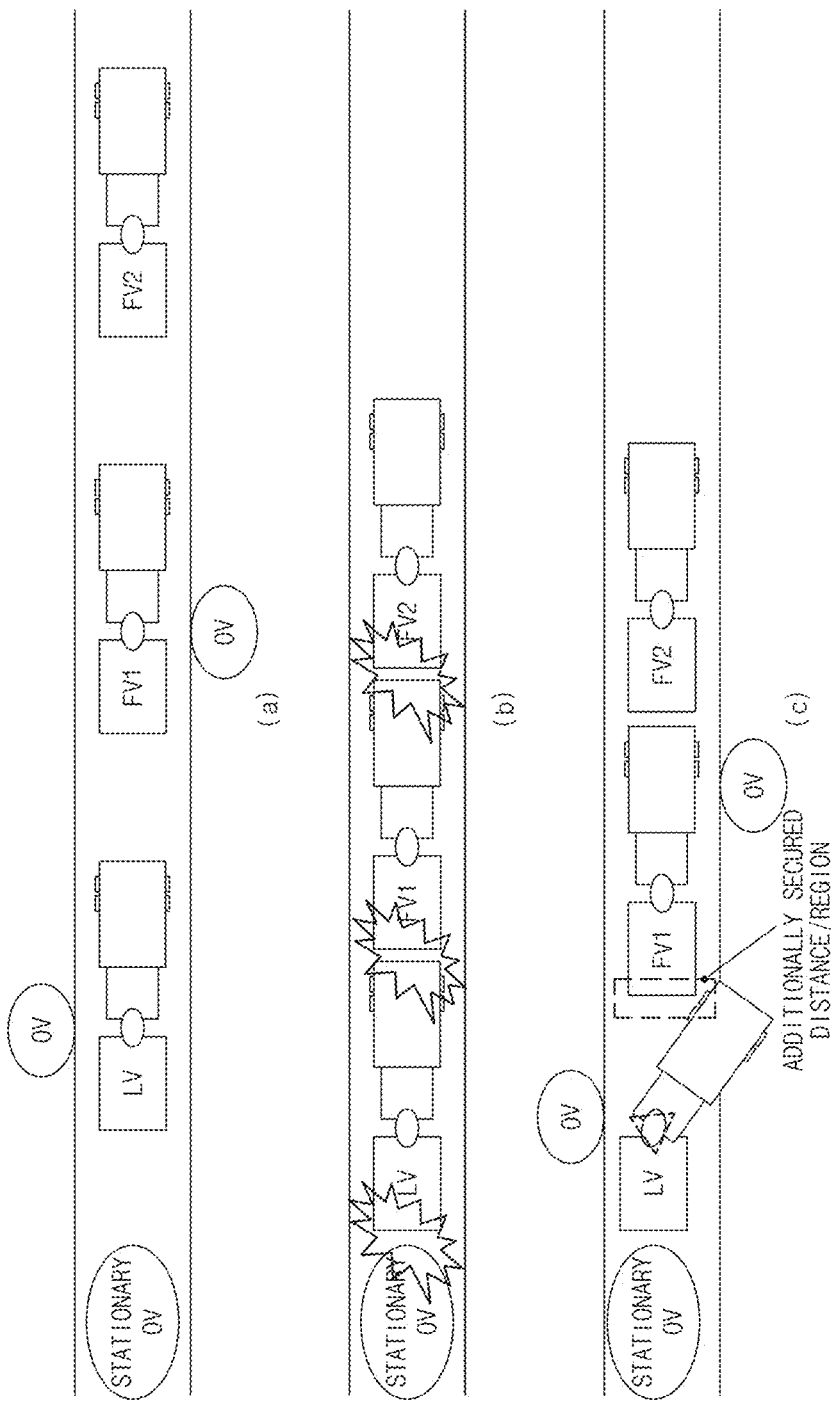
FIG. 2 is a view illustrating a collision avoidance situation at a time of an emergency stop according to the present disclosure.

FIG. 1 is a block diagram of a collision avoidance control device of a trailer vehicle in platooning according to the present disclosure. FIG. 2 is a view illustrating a collision avoidance situation at a time of an emergency stop according to the present disclosure.

Referring to FIG. 1, a collision avoidance control device of a trailer vehicle in platooning according to the present disclosure may include a jackknife induction determination module 100. The jackknife induction determination module 100 determines whether to execute jackknife induction control in a leading vehicle (LV) when an emergency braking situation occurs during the platooning of the trailer vehicle in which a trailer is coupled to a tractor. The collision avoidance control device may also include a jackknife induction control module 200 that provides an additional braking distance for a following vehicle (FV) at the rear of the tractor by inducing pivoting of the trailer while respectively performing braking control of the tractor and the trailer of the leading vehicle to allow a jackknife phenomenon to occur.

As such, in the present disclosure, the leading vehicle pivots the trailer to induce the jackknife phenomenon by the jackknife induction control module 200, so that the trailer may be deviated to a side of a traveling lane to provide an additional space for the following vehicle to stop at a location at the rear of the tractor on the traveling lane.

In a case of emergency braking resulted from a presence of an obstacle such as another vehicle (OV) that is stopped in front of the leading vehicle (LV) during platooning of a number of trailer vehicles as shown in (a) in FIG. 2, even with maximum emergency braking, the following vehicle (FV), which was traveling by following the leading vehicle (LV), may collide with the trailer of the leading vehicle because sufficient braking distance is not secured as shown in (b) in FIG. 2.

However, according to the present disclosure, by controlling the jackknife phenomenon to be induced within a certain angle range at the same time when the leading vehicle performs the maximum emergency braking, because the trailer of the leading vehicle deviates from the lane, it is possible to secure the additional braking distance resulted therefrom for the following vehicle to stop at a location at the rear of the leading vehicle on the travel lane as shown in (c) in FIG. 2. Thereby, a possibility of the occurrence of a collision accident is reduced.

As such, when securing an additional braking distance between the leading vehicle (LV) and a first following vehicle (FV1), because a braking distance between the first following vehicle (FV1) and a second following vehicle (FV2) is also increased, a possibility of an occurrence of a chain reaction collision accident may be reduced.

Figure 3:
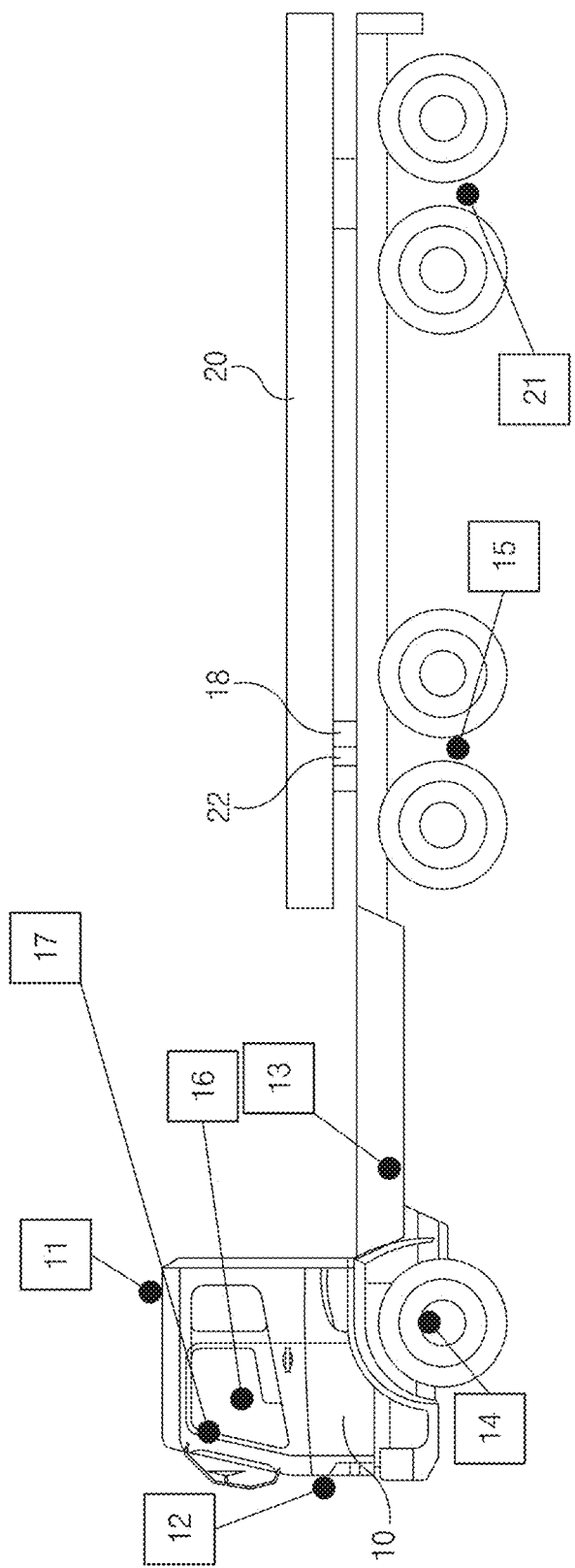
FIG. 3 is a view illustrating an example of installation of various sensors and control valves equipped in a trailer vehicle according to the present disclosure.

In general, in the trailer vehicle in the platooning, as shown in FIG. 3, after coupling a kingpin 22 equipped in a trailer 20 to a coupler 18 equipped in a tractor 10, the kingpin may be fixed with a fixing pin. The kingpin may thus be coupled so as not to be deviated from a center of the coupler.

The kingpin 22 coupled as such may be coupled to the coupler 18 and perform only a pivoting movement along a central axis of the coupling without moving in a left and right direction or in an up and down direction, and may move back and forth by a traction force of the tractor.

In addition, when the tractor performs a turning movement, the trailer, which is not able to be steered independently, may follow a turning trajectory of the tractor to make a dependent turning movement while pivoting about the central axis of the coupling.

However, when the trailer loses stability of a behavior in a yaw direction and loses adhesion of a tire to the ground during the turning movement, the trailer may pivot rapidly about the central axis of the coupling to cause the jackknife phenomenon, which may cause a major accident.

Accordingly, the trailer vehicle tends to prevent the jackknife phenomenon from occurring by properly performing braking control by vehicle dynamic control (VDC) based on an electronic brake system (EBS) in a usual travel environment. Also, in addition to the braking control of the electronic brake system (EBS), yaw directional control (oversteer and understeer control) and vehicle rollover control may be additionally performed to ensure safe travel.

In addition, as shown in FIG. 3, the trailer vehicle in platooning according to the present disclosure may include: a cab rear camera 11 installed on a top of a cab of the tractor to monitor a pivoting angle of the trailer; a forward collision-avoidance assist (FCA) 12 that determines the presence of the obstacle in front of the vehicle, including a camera and a radar for recognizing a situation of a region in front of the tractor; a yaw rate sensor 13 disposed on the tractor to measure a turning angle of the tractor; and a steering angle sensor (SAS) 16 that senses a steering angle of the tractor by steering mechanism manipulation in the tractor.

As a result, monitoring of the situation of the region in front of the tractor and monitoring of the pivoting situation of the trailer are possible. Also, continuous monitoring of the turning degree of the tractor by the steering mechanism manipulation is possible in the trailer vehicle in the platooning.

In addition, the trailer vehicle includes a front wheel braking control valve (an EBS front wheel individual control valve) 14 and a rear wheel braking control valve (an EBS rear wheel individual control valve) 15 for braking of the tractor. The trailer vehicle also includes a trailer wheel braking control valve (an EBS trailer wheel) 21 for the braking of the trailer to implement braking of the trailer vehicle.

A side camera 17 for identifying a presence of other vehicle or the like approaching from the rear on each of both lanes next to the traveling lane in selecting an adjacent lane for pivoting the trailer by the jackknife induction control module may be further included on each of side mirrors of both sides of such tractor.

In addition, the jackknife induction determination module 100 may include a maximum emergency braking device 110 that determines whether to execute the maximum emergency braking by comparing an actual distance S1 between the leading vehicle recognizing a presence of a front object and the front object with a minimum braking distance S1' at a time when executing emergency braking of the leading vehicle. The jackknife induction determination module 100 may further include an emergency braking command transmitting device 120 that induces emergency braking of the following vehicle by transmitting an emergency braking command from the leading vehicle executing the maximum emergency braking to the following vehicle. The jackknife induction determination module 100 may also include a jackknife request receiving device 130 that receives a jackknife execution request for securing the additional braking distance transmitted from the following vehicle and determines the execution of the jackknife induction control.

In this connection, the following vehicle may further include a jackknife request device 140 that receives the emergency braking command, then compares a minimum braking distance S2' of the following vehicle with an actual distance S2 to the leading vehicle, and then requests the leading vehicle to execute the jackknife induction control for securing the additional braking distance when the minimum braking distance of the following vehicle is greater.

Because the jackknife induction determination module 100 is to be equipped in the trailer vehicle for the platooning, not only a case in which the corresponding vehicle travels as the leading vehicle (LV) of the platooning, but also, a case in which the corresponding vehicle travels as the following vehicle (FV) may be possible.

Accordingly, the trailer vehicle may not only include the maximum emergency braking device, the emergency braking command transmitting device, and the jackknife request receiving device that are activated when the trailer vehicle is in the platooning as the leading vehicle (LV), but may also, include the jackknife request device activated when the same trailer vehicle is in the platooning as the following vehicle (FV).

As such, the same trailer vehicle may become the leading vehicle (LV) as well as the following vehicle (FV). In describing the jackknife induction determination module, the maximum emergency braking device, the emergency braking command transmitting device, and the jackknife request receiving device are described based on the case of travel as the leading vehicle (LV) and the jackknife request receiving device is described based on the case of travel as the following vehicle (FV).

Figure 4:
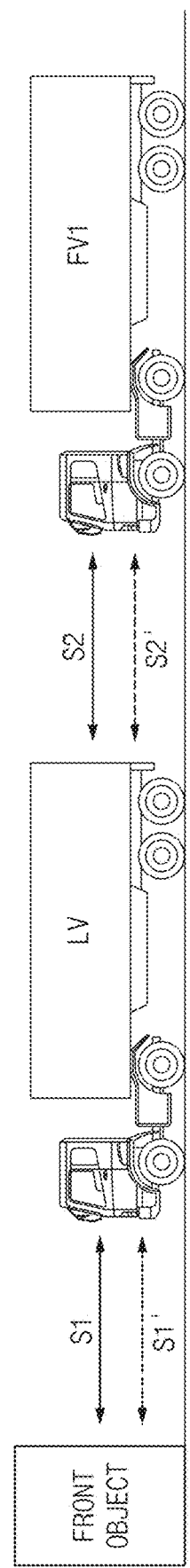
FIG. 4 is a configuration diagram showing an example of determining whether to perform jackknife induction control according to the present disclosure.

As shown in FIG. 4, when it is determined that the braking is necessary as the front object is sensed during the platooning, the maximum emergency braking device 110 may calculate the minimum braking distance S1' that is traveled while performing the emergency braking at a current speed until stopping, compare the calculated minimum braking distance S1' with the actual distance s1 to the front object, and determine to perform the maximum emergency braking of the leading vehicle when the minimum braking distance S1' is greater.

In other words, the maximum emergency braking device 110 may determine how much braking force needs to be generated when the front object requiring the stop is sensed. Examples would be a case in which another vehicle enters a region in front of the leading vehicle (LV) in the platooning and brakes, a case in which an object in a stationary state is sensed while traveling on a curve, or the like.

To this end, the maximum emergency braking device 110 may recognize the actual distance S1 between the leading vehicle and the front object by a sensing result from the forward collision-avoidance assist (FCA) 12. The maximum emergency braking device may then calculate the minimum braking distance S1' that will be traveled until stopping when the emergency braking is performed at maximum at the current travel speed.

In this connection, the calculation of the minimum braking distance S1' by the maximum emergency braking device 110 is the same as the calculation of the minimum braking distance S2' by the jackknife request device equipped in the following vehicle (FV1).

When the minimum braking distance is greater than the actual distance, the maximum emergency braking device 110 may control to execute the maximum emergency braking that generates a maximum braking force. In this connection, even when the minimum braking distance is smaller than the actual distance, when a difference therebetween is not great, the maximum emergency braking device 110 may also control the braking force of the emergency braking to be close to that in the maximum emergency braking to prevent a collision with the front object.

In other words, braking distances of the following vehicles in the platooning are able to be secured more sufficiently when the braking distance of the leading vehicle is secured as great as possible within a range capable of preventing the collision. Thus, the maximum emergency braking device may control to generate a great braking force.

In addition, when the maximum emergency braking device executes the maximum emergency braking, the emergency braking command transmitting device 120 may notify the execution of such maximum emergency braking to the following vehicle (indicated as FV1 in FIG. 4) in the platooning together, and at the same time, transmit the emergency braking command requesting to execute the emergency braking also in the following vehicle.

In other words, because the following vehicle travels by following the leading vehicle, it is difficult for the following vehicle to identify a situation of a region in front of the leading vehicle. Accordingly, the emergency braking command transmitting device 120 may notify that the situation requiring the maximum emergency braking has occurred to allow the emergency braking to be performed also in the following vehicle.

As such, the following vehicle (FV1) that has received the emergency braking command may perform the emergency braking on its own. At the same time, the jackknife request device may calculate the minimum braking distance S2' required in the maximum emergency braking in the following vehicle and then compare the minimum braking distance S2' with the actual distance S2 to the leading vehicle to determine whether to send a request to the leading vehicle for the jackknife induction control.

To this end, the jackknife request device 140 may use a deceleration required to perform the maximum emergency braking in the following vehicle (FV1), and a speed change amount (ΔV=V0−V1) of a vehicle stopping speed V1 compared to a speed V0 immediately before the braking of the following vehicle (FV1) to calculate a time "t" it takes for the following vehicle (FV1) to stop as shown in following Mathematical Equation 1.

$$t = \frac{\Delta V}{a} \quad \text{[Mathematical equation 1]}$$

In this connection, the deceleration "a" in Mathematical equation 1 above may have a maximum deceleration of about 6 to 6.5 (m/s$^2$) based on an empty vehicle state and a loaded vehicle state. Such deceleration "a" may be calculated by dividing a maximum braking force "F" of the following vehicle (FV1) by a weight "m" thereof.

As described above, the minimum braking distance S2' required until the following vehicle (FV1) stops may be calculated as shown in following Mathematical Equation 2 below using the time "t" and the deceleration "a" derived by Mathematical Equation 1.

$$S2' = V0*t + \frac{1}{2}*a*t^2 \quad \text{[Mathematical equation 2]}$$

When it is determined that the minimum braking distance S2' calculated by Mathematical equation 2 above is greater than the actual distance S2 from the leading vehicle, because a collision with a rear-end of the leading vehicle is expected to occur despite the maximum emergency braking, the jackknife request device 140 may request the leading vehicle (LV) to execute the jackknife induction control to secure the additional braking distance.

In addition, the jackknife request receiving device 130 of the leading vehicle (LV) that has received the jackknife induction control execution request transmitted from the following vehicle (FV1) may determine to execute the control for inducing the jackknife phenomenon in which the trailer bends and deviates from the lane during the emergency stop currently in progress.

As such, the jackknife request device 140 equipped in the following vehicle (FV) may perform the calculation and the comparison of the minimum braking distance during initial execution (about 50 ms) of the emergency braking to rapidly request the induction of the jackknife phenomenon. The jackknife request receiving device 130 equipped in the leading vehicle (LV) that has received the request may rapidly determine whether to execute the emergency braking during the initial execution (about 100 ms) of the emergency braking.

In addition, the jackknife induction control module 200 may include a pivoting induction direction determining device 210 that selects a lane to be entered by the trailer bending by the jackknife phenomenon among the lanes on the both sides of the leading vehicle in the platooning and determines a pivoting induction direction. The jackknife induction control module 200 may also include a trailer pivoting induction device 220 that reduces a braking force of a trailer braking control valve disposed on a pivoting induced-side to induce a difference in the braking force, thereby inducing pivoting of the trailer in the pivoting induction direction to cause the jackknife phenomenon.

In this connection, the pivoting induction direction determining device 210 may determine a direction of a lane without a vehicle at the rear of the trailer vehicle among the both lanes next to the traveling lane as the pivoting induction direction in which the trailer is to be bent by images filmed by the side cameras respectively disposed on the left and right side mirrors of the tractor.

Figure 5:
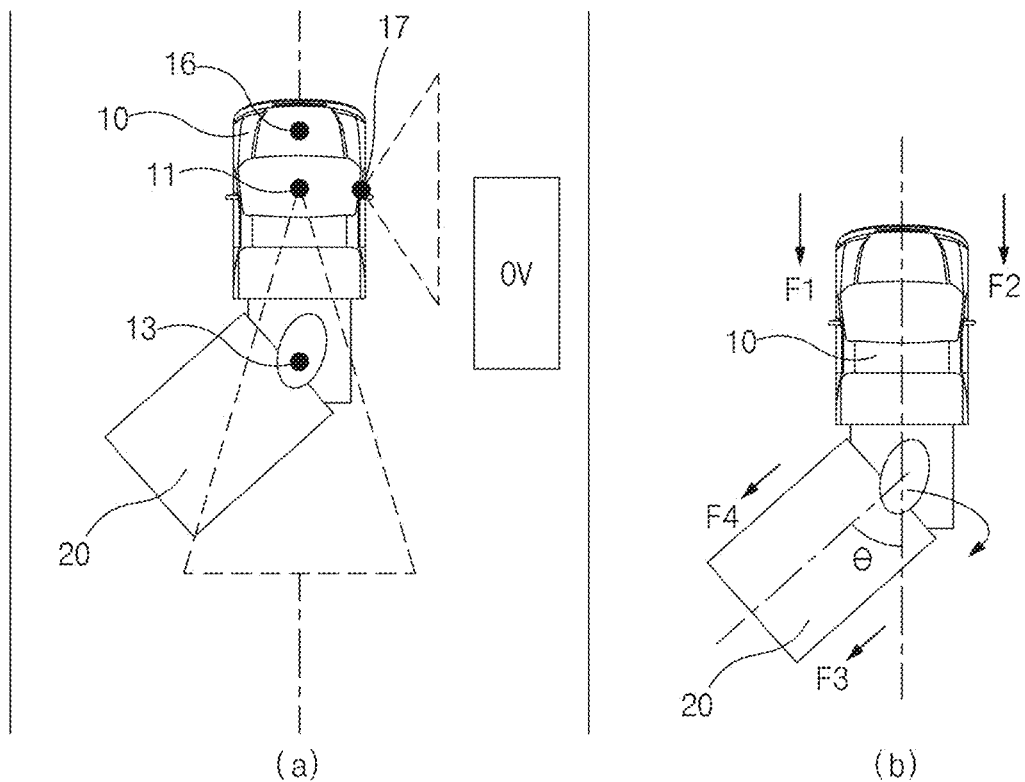
FIG. 5 is a configuration diagram showing that jackknife induction control is implemented on a straight travel road according to the present disclosure.

As shown in (a) in FIG. 5, after recognizing that another vehicle (OV) is traveling on a right lane by the camera disposed on the right sideview mirror, a left lane is determined as the lane to be entered by the trailer. It is also determined to induce pivoting of the trailer in a left direction (i.e., pivoting of the traveling trailer in a clockwise direction). As shown in (b) in FIG. 5, because a rear portion of the trailer pivots about a front surface of the trailer where the kingpin is coupled to the coupler of the tractor, the trailer must be pivoted in the clockwise direction to pivot toward the left lane.

In addition, the trailer pivoting induction device 220 may apply a control command for reducing a braking force of the pivoting induced-side (a left side in (b) in FIG. 5) to the braking control valve of the trailer to pivot the rear portion of the trailer in the pivoting induction direction such that the trailer causes the jackknife phenomenon while pivoting about a coupling portion of the trailer coupled to the tractor.

In other words, when the same braking force is applied to a left braking control valve and a right braking control valve of the trailer, the trailer stops while maintaining a current travel state. However, when a braking force applied to either side is reduced to generate the difference in the braking force, an understeer phenomenon is temporarily induced on the side with the reduced braking force, causing pivoting in a direction toward the side with the reduced braking force.

Accordingly, the trailer pivoting induction device 220 may induce the pivoting in the clockwise direction by reducing the braking force of the left braking control valve when the pivoting induction direction is a direction toward the left lane. The trailer pivoting induction device 220 may induce pivoting in a counterclockwise direction by reducing the braking force of the right braking control valve when the pivoting induction direction is a direction toward the right lane.

In addition, when the road on which the trailer vehicle is traveling is a straight road as shown in (a) in FIG. 5, the trailer pivoting induction device 220 may perform the control of the braking force of the trailer and the control of the braking force of the tractor together.

Accordingly, when the steering angle measured by the steering angle sensor (SAS) 16 is less than a certain angle (e.g., 35°), the trailer pivoting induction device 220 may determine that the trailer vehicle is traveling on the straight road and apply a control command for reducing a braking force of a side opposite to the pivoting induced-side to the braking control valve of the tractor to induce turning of the tractor in a direction opposite to the pivoting induction direction.

In other words, the trailer pivoting induction device 220 may cause a torque in the direction opposite to the pivoting induction direction of the trailer to the tractor by temporarily inducing an oversteer phenomenon by reducing the braking force of the side of the tractor traveling on the straight road opposite to the side where the braking force is reduced of the trailer. As a result, an entirety of the vehicle may be prevented from turning in the same direction, and an angle between the tractor and the trailer may be rapidly increased.

As such, by the trailer pivoting induction device 220, one wheel braking control for creating the temporary oversteer state may be performed on the tractor. At the same time, braking control for creating the understeer state may be performed on the trailer on the pivoting induced-side, thereby inducing the trailer vehicle to stop while exhibiting the jackknife phenomenon.

As shown in (b) in FIG. 5 showing the case of traveling on the straight road, when the pivoting induction direction of the trailer is determined as the direction toward the left lane of the vehicle, the trailer pivoting induction device 220 may induce the jackknife phenomenon by not only reducing a right braking force F2 of the tractor to induce the turning in the counterclockwise direction of the tractor, but also reducing a left braking force F4 of the trailer to induce the pivoting in the clockwise direction of the trailer.

Figure 6:
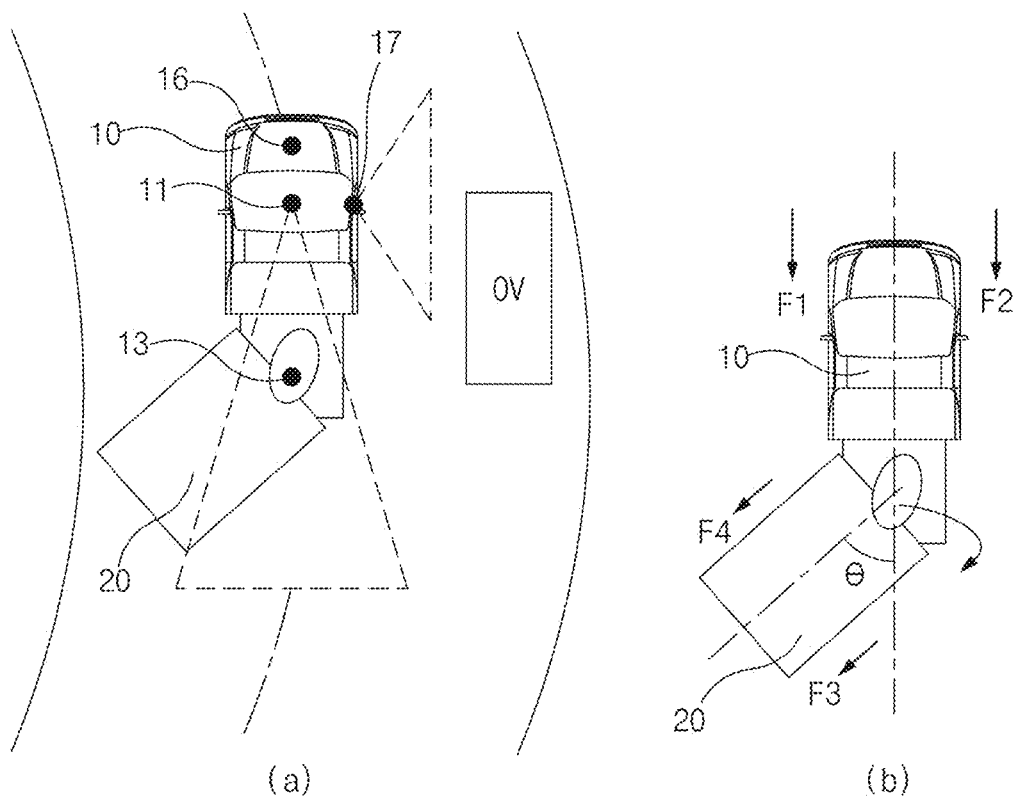
FIG. 6 is a configuration diagram showing that jackknife induction control is implemented on a curved travel road according to the present disclosure.

In addition, when the steering angle measured by the steering angle sensor (SAS) 16 is equal to or greater than a certain angle (e.g., 40°), the trailer pivoting induction device 220 may determine that the trailer vehicle is traveling on the curve as shown in (a) in FIG. 6.

As such, when it is determined that the trailer vehicle is traveling on the curve, and the curve and the pivoting induction direction are directed to the same side, the torque in the direction opposite to the pivoting induction direction is already generated in the tractor traveling on the curve.

Therefore, the trailer pivoting induction device 220 may induce the pivoting of the trailer simply by generating the control command for reducing the braking force of the braking control valve located on the pivoting induced-side of the trailer without the braking control of the tractor.

In this connection, when it is determined that the trailer vehicle is traveling on the curve, but the curve and the pivoting induction direction are directed to different sides, the trailer pivoting induction device 220 may not only induce the pivoting of the trailer by generating the control command for reducing the braking force of the braking control valve located on the pivoting induced-side, but also induce the torque in the direction opposite to the pivoting induction direction of the trailer by generating, for the tractor, the control command for reducing the braking force of the side opposite to the side with the reduced braking force of the trailer.

In addition, the jackknife induction control module 200 may further include a tractor monitoring device 230 that maintains a turning range of the tractor within a limit yaw rate range by reducing the difference in the braking force of the tractor to reduce a yaw rate of the tractor when a sensed yaw rate indicating the turning degree of the tractor is out of the preset limit yaw rate range.

To this end, when the tractor travels on the straight road, the tractor monitoring device 230 may continuously receive the measured value from the yaw rate sensor 13 equipped on the tractor and may monitor whether the measured sensed yaw rate deviates from the limit yaw rate range preset based on a speed of the vehicle.

In the embodiment in which the tractor is traveling on the straight road, the limit yaw rate range was set as a range from 3.5°/s (i.e., degrees per second) to 5°/s for a case in which a speed of the tractor is 80 kph, but a value of the limit yaw rate range may be set differently depending on a loading degree of the trailer without being limited to such specific value.

When the sensed yaw rate is beyond the limit yaw rate range, the tractor monitoring device 230 may reduce the difference in the braking force by increasing the braking force of the braking control valve on the side where the braking force was reduced and by decreasing the braking force of the braking control valve on the side where the braking force was maintained to return the travel direction of the tractor to the forward direction again. As such, to return the travel direction of the tractor to the forward direction again, it is possible to control the difference in the braking force to decrease until the sensed yaw rate reaches 0 to 1°/s.

While maintaining the state of travel in the forward direction while performing the control such that the turning range of the tractor does not deviate from the preset limit yaw rate range, because a differential braking control state applied to the trailer (a state in which a reduced braking force is applied to a tire on the pivoting induced-side and a maximum braking force is applied to a tire opposite to the on the pivoting induced-side) remains the same, without affecting the travel of the tractor, a jackknife angle (θ) through the pivoting of the trailer gradually increases to realize the jackknife phenomenon.

In addition, even when the tractor is traveling on the curve, the tractor monitoring device 230 may continuously receive the value measured by the yaw rate sensor equipped on the tractor to monitor whether the sensed yaw rate deviates from the limit yaw rate range preset based on the speed of the vehicle.

In the embodiment in which the tractor is traveling on the curve, the limit yaw rate range was set as a range from 2.5°/s to 4°/s for the case in which the speed of the tractor is 80 kph, but the value of the limit yaw rate range may be set differently depending on the loading degree of the trailer without being limited to such specific value. In this connection, the limit yaw rate range reflects a safety factor, and is set as a total sum of yaw rates including a sum of existing yaw rate values (old yaw Rates) already implemented while traveling on the curve before the jackknife induction. Thereby, the tractor Is prevented from turning excessively during the curve travel.

Even when traveling on the curve as such, when the sensed yaw rate deviates from the limit yaw rate range, the tractor monitoring device 230 may reduce the difference in the braking force by increasing the braking force of the braking control valve located on the side opposite to the pivoting induced-side among the braking control valves of the tractor, and by decreasing the braking force of the braking control valve on the side where the braking force was maintained to allow the tractor to travel in the curved manner again.

As such, to allow the tractor to travel in the curved manner again, it is possible to control the difference in the braking force to decrease until the sensed yaw rate measured by the yaw rate sensor reaches a yaw rate before the turning of the tractor is induced.

As such, while performing the control such that the turning range of the tractor does not deviate from the preset limit yaw rate range, the jackknife angle (θ) is increased while the differential braking control state applied to the trailer is maintained. This is the same as in the case of the straight road travel described above.

In addition, the jackknife induction control module 200 may further include a trailer pivoting monitoring device 240 that controls to reduce the pivoting angle of the trailer by blocking the pivoting of the trailer by reducing the difference in the braking force applied to the braking control valves of the trailer when the pivoting angle of the trailer is beyond a preset required pivoting angle range.

Accordingly, in the case of the trailer vehicle traveling on the straight road as shown in FIG. 5, when it is determined that the pivoting angle of the trailer measured based on the image filmed by the cab rear camera 11 disposed on the top of the cab of the tractor is beyond the preset required pivoting angle range (e.g., a range from 45° to 60°), the trailer pivoting monitoring device 240 may control to decrease the difference in the braking force applied to the braking control valves of the trailer to reduce the pivoting degree of the trailer.

To this end, in the case of (b) in FIG. 5, the pivoting degree of the trailer may be decreased by alleviating the temporary understeer phenomenon caused to the trailer by increasing the braking force F4 on the pivoting induced-side where the braking force was reduced by the trailer pivoting induction device, and by reducing a braking force F3 on the opposite side where the braking force during the emergency braking was maintained.

In addition, also in the case of the trailer vehicle traveling on the curve as shown in FIG. 6, when it is determined that the pivoting angle of the trailer measured based on the image filmed by the cab rear camera 11 disposed on the top of the cab of the tractor is beyond the preset required pivoting angle range (e.g., a range from 35° to 50°), the trailer pivoting monitoring device 240 may control to decrease the difference in the braking force applied to the braking control valves of the trailer to reduce the pivoting degree of the trailer. In this connection, in the case of the trailer vehicle traveling on the curve, the required pivoting angle may be set small by reflecting the safety factor when compared to the case of traveling on the straight road.

In addition, the jackknife induction control module 200 may further include a feedback controller 250 that controls the braking forces of the braking control valves of the tractor and the trailer. Thus, the sensed yaw rate of the tractor measured by the yaw rate sensor 13 is maintained within the preset limit yaw rate range until the trailer vehicle stops. Also, the pivoting angle of the trailer measured based on the image filmed by the cab rear camera 16 is maintained within the preset required pivoting angle range.

The feedback controller 250 may perform control to reduce the difference in the braking force when the sensed yaw rate of the tractor increases beyond the limit yaw rate range and to increase the difference in the braking force when the sensed yaw rate decreases to be below the limit yaw rate range.

In addition, the feedback controller 250 may perform control to reduce the difference in the braking force when the pivoting angle of the trailer increases to be equal to or higher than the required pivoting angle and to increase the difference in the braking force when the pivoting angle of the trailer decreases to be equal to or lower than the required pivoting angle.

Accordingly, the trailer vehicle may be stopped while forming the jackknife angle within a safe range. As a result, it is possible to provide an additional braking distance, which corresponds to a distance corresponding to a degree to which the trailer is pivoted toward the lane next to the traveling lane, to the following vehicle at a location immediately behind the tractor. Thereby, the occurrence of the collision accident may be prevented.

Next, a collision avoidance control method of a trailer vehicle in platooning according to another embodiment of the present disclosure is described with reference to FIGS. 7-9.

Figure 7:
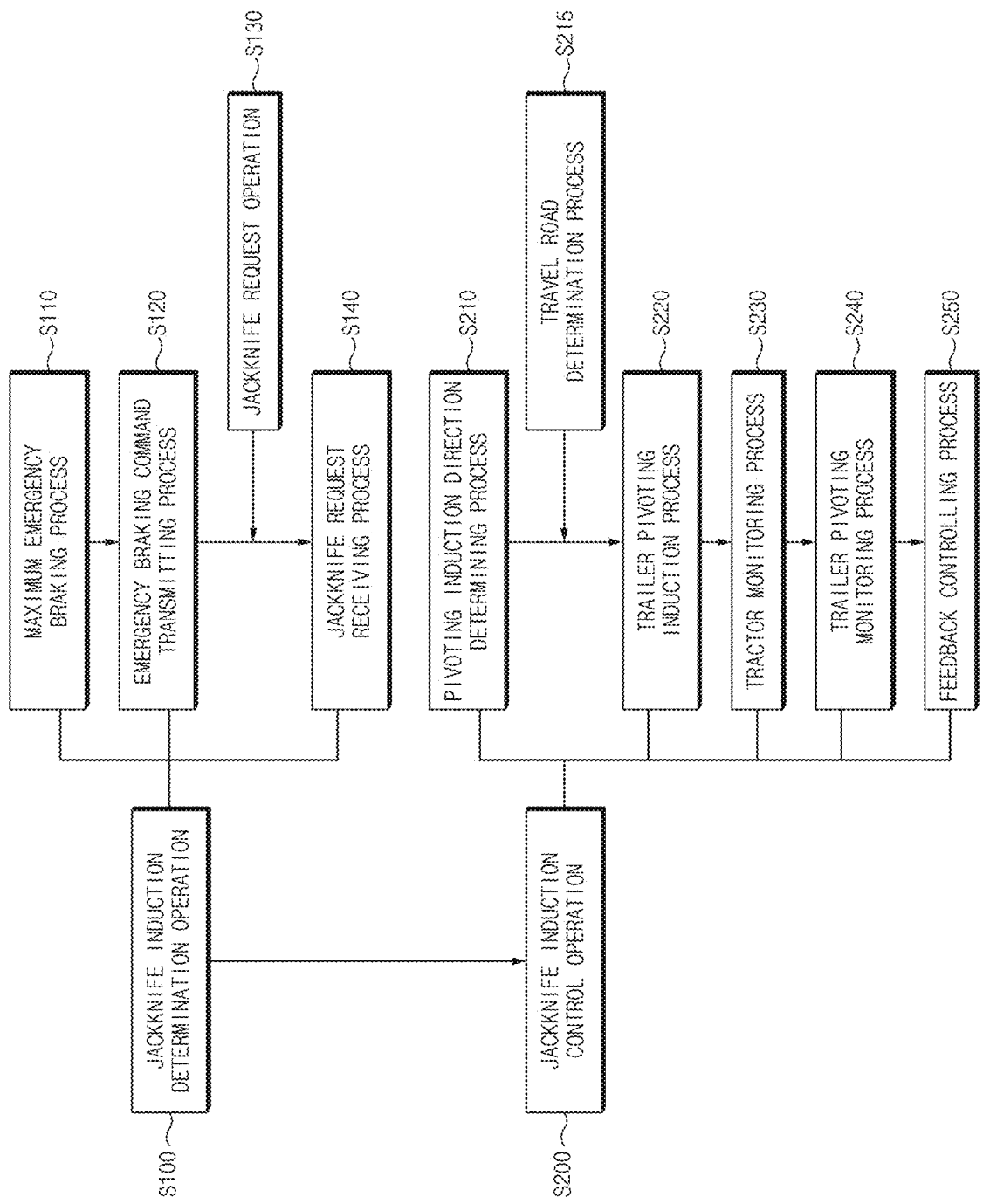
FIG. 7 is a configuration diagram of a collision avoidance control method of a trailer vehicle in platooning according to another embodiment of the present disclosure.

FIG. 7 is a configuration diagram of a collision avoidance control method of a trailer vehicle in platooning according to another embodiment of the present disclosure. FIG. 8 is a flowchart showing a flow for determining whether to perform jackknife induction control according to another embodiment of the present disclosure. FIG. 9 is a flowchart showing a flow in which jackknife induction control is implemented on a straight travel road according to another embodiment of the present disclosure.

Referring to FIG. 7, the collision avoidance control method of the trailer vehicle in platooning according to another embodiment of the present disclosure may include a jackknife induction determination operation (S100) that determines whether to execute the jackknife induction control in the leading vehicle (LV) when the emergency braking situation occurs during the platooning of the trailer vehicle in which the trailer is coupled to the tractor. The collision avoidance control method also may include a jackknife induction control operation (S200) that provides the additional braking distance of the following vehicle (FV) at the rear of the tractor by inducing the pivoting of the trailer while respectively performing the braking control of the tractor and the trailer of the leading vehicle to allow the jackknife phenomenon to occur when it is determine to execute the jackknife induction control.

The jackknife induction determination operation (S100) may include a maximum emergency braking process (S110) that determines whether to execute the maximum emergency braking by comparing the actual distance S1 between the leading vehicle recognizing the presence of the front object and the front object with the minimum braking distance S1' at the time when executing the emergency braking of the leading vehicle. The jackknife induction determination operation (S100) may also include an emergency braking command transmitting process (S120) that induces the emergency braking of the following vehicle by transmitting the emergency braking command from the leading vehicle executing the maximum emergency braking to the following vehicle. The jackknife induction determination operation (S100) may further include a jackknife request process (S130) that receives the emergency braking command, then compares the minimum braking distance S2' at the time when executing the emergency braking of the following vehicle with the actual distance S2 to the leading vehicle, and then requests the leading vehicle to execute the jackknife induction control for securing the additional braking distance when the minimum braking distance of the following vehicle is greater. The jackknife induction determination operation (S100) may also include a jackknife request receiving process (S140) that receives the jackknife induction control execution request transmitted from the following vehicle and determines the execution of the jackknife induction control.

Figure 8:
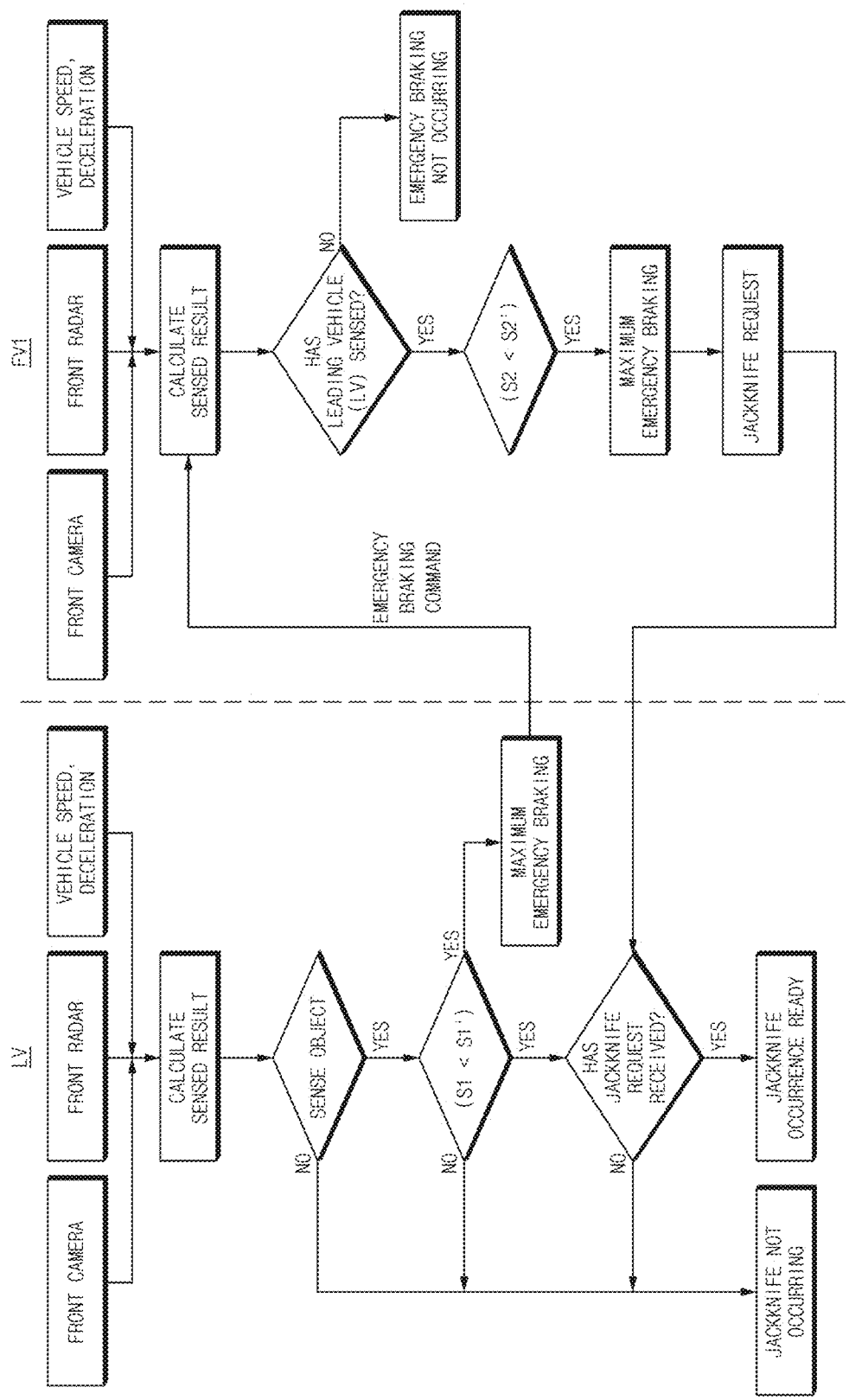
FIG. 8 is a flowchart showing a process for determining whether to perform jackknife induction control according to another embodiment of the present disclosure.

In the maximum emergency braking process (S110), as shown in FIG. 8, the minimum braking distance S1' that is traveled by the leading vehicle (LV) sensed the presence of the front object while performing the emergency braking until stopping may be calculated. Then the calculated minimum braking distance S1' may be compared with the actual distance S1 to the front object and then the maximum emergency braking may be determined to be performed when the minimum braking distance S1' is greater.

In addition, in the emergency braking command transmitting process (S120), the execution of the maximum emergency braking of the leading vehicle (LV) may be notified to the following vehicle (FV) in the platooning. At the same time, the emergency braking command requesting to execute the emergency braking may be transmitted also to the following vehicle.

In the jackknife request process (S130), at the same time as the emergency braking is performed in the following vehicle (FV) that has received the emergency braking command on its own, the minimum braking distance S2' required in the maximum emergency braking may be calculated. Then the minimum braking distance S2' may be compared with the actual distance S2 to the leading vehicle to determine whether to send a request to the leading vehicle for the jackknife induction control.

In this connection, in the jackknife request process (S130), as shown in FIG. 8, when it is determined that the minimum braking distance S2' calculated using the speed and the maximum braking force of the following vehicle is greater than the actual distance S2 from the leading vehicle, because the collision with the rear-end of the leading vehicle is expected to occur despite the maximum emergency braking, the execution of the jackknife induction control may be requested to the leading vehicle (LV) to secure the additional braking distance.

In the jackknife request receiving process (S140), the leading vehicle (LV) that has received the execution request of the jackknife induction control may determine to execute the control for inducing the jackknife phenomenon in which the trailer bends and deviates from the lane during the emergency stop.

In addition, the jackknife induction control operation (S200) may include a pivoting induction direction determining process (S210) that selects the lane to be entered by the trailer while being bent among the lanes on the both sides of the leading vehicle in the platooning and that determines the pivoting induction direction. The jackknife induction control operation (S200) may also include a trailer pivoting induction process (S220) that reduces the braking force of the trailer braking control valve disposed on the pivoting induced-side to induce the difference in the braking force. Thereby, the pivoting of the trailer in the pivoting induction direction may be induced to cause the jackknife phenomenon.

In this connection, in the pivoting induction direction determining process (S210), by the images filmed by the side cameras respectively disposed on the left and right side mirrors of the tractor, the direction in which the lane without the vehicle behind the trailer vehicle is located among the both lanes may be determined as the pivoting induction direction in which the trailer will be bent.

In addition, the jackknife induction control operation (S200) may further include a travel road determination process (S215) of determining the traveling road as the straight road when the steering angle measured by the steering angle sensor (SAS) disposed in the tractor is less than the certain angle and of determining the traveling road as the curve when the steering angle is equal to or greater than the certain angle.

As such, whether the current road is the straight road or the curved road is identified in advance in the travel road determination process (S215). In inducing the pivoting of the trailer in the trailer pivoting induction process (S220), it may be determined whether to reduce the braking force for forcibly inducing the turning of the tractor.

In addition, in the trailer pivoting induction process (S220), the control command for reducing the braking force on the pivoting induced-side may be applied to the braking control valve of the trailer to pivot the rear portion of the trailer in the pivoting induction direction.

In other words, when the same braking force is applied to the left braking control valve and the right braking control valve of the trailer, the trailer stops while maintaining the current travel state. However, when the braking force applied to either side is reduced to generate the difference in the braking force, the understeer phenomenon is temporarily induced on the side with the reduced braking force, causing the pivoting in the direction toward the side with the reduced braking force.

Accordingly, in the trailer pivoting induction process (S220), the pivoting in the clockwise direction may be induced by reducing the braking force of the left braking control valve when the pivoting induction direction is the direction toward the left lane. The pivoting in the counterclockwise direction may be induced by reducing the braking force of the right braking control valve when the pivoting induction direction is the direction toward the right lane.

Figure 9:
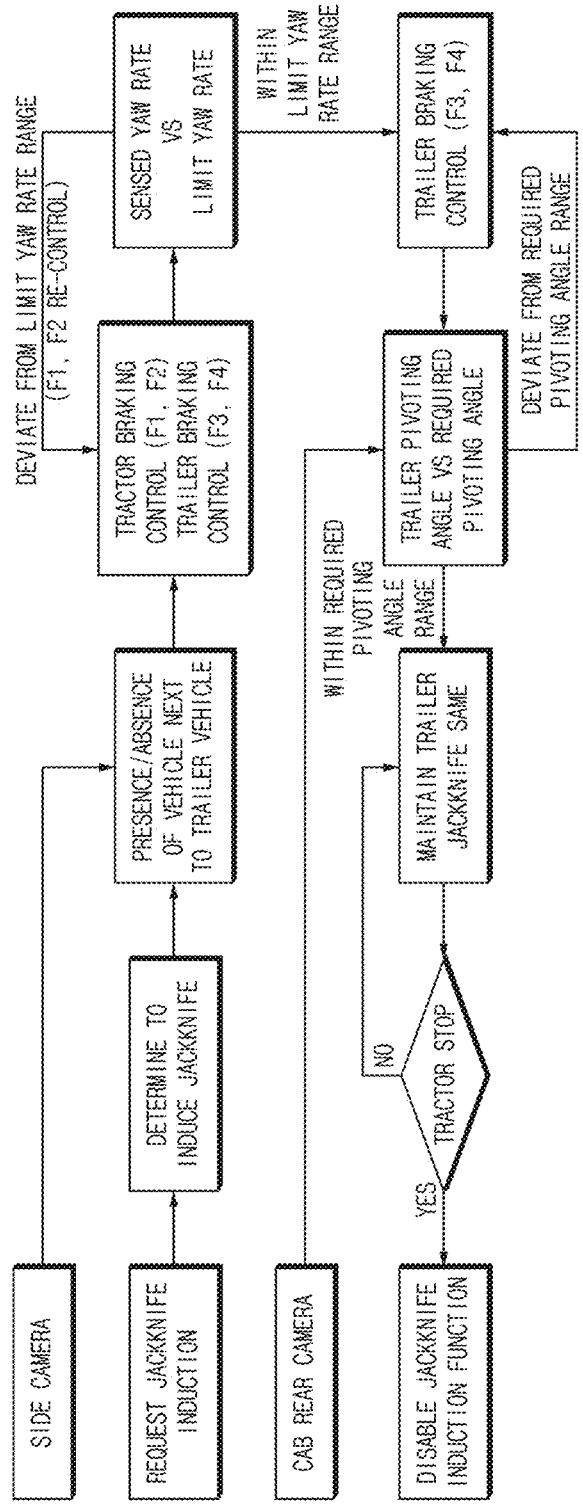
FIG. 9 is a flowchart showing a process in which jackknife induction control is implemented on a straight travel road according to another embodiment of the present disclosure.

In addition, when the road on which the trailer vehicle is traveling is the straight road, as shown in FIG. 9, in the trailer pivoting induction process (S220), the control of the braking force of the trailer and the control of the braking force of the tractor may be performed together.

Accordingly, in the trailer pivoting induction process (S220), when it is determined that the trailer vehicle is traveling on the straight road, the control command for reducing the braking force of the side opposite to the pivoting induced-side may be applied to the braking control valve of the tractor to induce turning of the tractor in the direction opposite to the pivoting induction direction.

In other words, in the trailer pivoting induction process (S220), the torque in the direction opposite to the pivoting induction direction of the trailer may be imparted to the tractor by temporarily inducing the oversteer phenomenon by reducing the braking force of the side of the tractor traveling on the straight road opposite to the side where the braking force is reduced of the trailer.

As such, when it is determined that the trailer vehicle is traveling on a curve, and the curve and the pivoting induction direction are directed to the same side, the torque in the direction opposite to the pivoting induction direction is already generated in the tractor traveling on the curve.

Therefore, in the trailer pivoting induction process (S220), the pivoting of the trailer may be induced simply by generating the control command for reducing the braking force of the braking control valve located on the pivoting induced-side of the trailer without the braking control of the tractor.

In addition, when it is determined that the trailer vehicle is traveling on the curve, but the curve and the pivoting induction direction are directed to different sides, in the trailer pivoting induction process (S220), not only the pivoting of the trailer may be induced by generating the control command for reducing the braking force of the braking control valve located on the pivoting induced-side, but also the torque in the direction opposite to the pivoting induction direction of the trailer may be induced by generating, for the tractor, the control command for reducing the braking force of the side opposite to the side with the reduced braking force of the trailer.

In addition, the jackknife induction control operation (S200) may further include a tractor monitoring process (S230) that maintains the turning range of the tractor within the limit yaw rate range by reducing the difference in the braking force of the tractor to reduce the yaw rate of the tractor when the sensed yaw rate indicating the turning degree of the tractor is out of the preset limit yaw rate range.

To this end, in the tractor monitoring process (S230), when the sensed yaw rate is beyond the limit yaw rate range, difference in the braking force may be reduced by increasing the braking force of the braking control valve on the side where the braking force was reduced and decreasing the braking force of the braking control valve on the side where the braking force was maintained to return the travel direction of the tractor to the forward direction again.

As such, while performing the control such that the turning range of the tractor does not deviate from the preset limit yaw rate range, because the differential braking control state applied to the trailer remains the same, without affecting the travel of the tractor, the jackknife angle (θ) through the pivoting of the trailer gradually increases to realize the jackknife phenomenon.

In addition, in the tractor monitoring process (S230), even when the tractor is traveling on the curve in addition to the case in which the tractor is traveling on the straight road, the sensed yaw rate measured by the yaw rate sensor equipped on the tractor may be continuously received to monitor whether the sensed yaw rate deviates from the limit yaw rate range.

Accordingly, in the tractor monitoring process (S230), when the sensed yaw rate deviates from the limit yaw rate range, the difference in the braking force of the tractor may be decreased to restore the forward travel state in the case of the straight road and may be decreased to restore the state of traveling in the curved manner before the jackknife induction in the case of the curved road.

In addition, the jackknife induction control operation (S200) may further include a trailer pivoting monitoring process (S240) that controls to reduce the pivoting angle of the trailer by blocking the pivoting of the trailer by reducing the difference in the braking force applied to the braking control valves of the trailer when the pivoting angle of the trailer is beyond the preset required pivoting angle range.

Accordingly, in the trailer pivoting monitoring process (S240), when it is determined that the pivoting angle of the trailer, measured based on the image filmed by the cab rear camera disposed on the top of the cab of the tractor, is beyond the preset required pivoting angle range (e.g., the range from 45° to 60°), the control may be performed to decrease the difference in the braking force applied to the braking control valves of the trailer.

To this end, in the trailer pivoting monitoring process (S240), the pivoting degree of the trailer may be decreased by alleviating the temporary understeer phenomenon caused to the trailer by increasing the braking force on the pivoting induced-side where the braking force was reduced, and by reducing the braking force on the opposite side where the braking force during the emergency braking was maintained.

In addition, the jackknife induction control operation (S200) may further include a feedback controlling process (S250) that controls the braking forces of the braking control valves of the tractor and the trailer such that the sensed yaw rate of the tractor measured by the yaw rate sensor is maintained within the preset limit yaw rate range until the trailer vehicle stops, and such that the pivoting angle of the trailer measured based on the image filmed by the cab rear camera is maintained within the preset required pivoting angle range.

In this connection, in the feedback controlling process (S250), the control may be performed to reduce the difference in the braking force of the tractor when the sensed yaw rate of the tractor increases beyond the limit yaw rate range, and to increase the difference in the braking force of the tractor when the sensed yaw rate decreases to be below the limit yaw rate range.

In addition, in the feedback controlling process (S250), the control may be performed to reduce the difference in the braking force of the trailer when the pivoting angle of the trailer increases to be equal to or higher than the required pivoting angle, and to increase the difference in the braking force of the trailer when the pivoting angle of the trailer decreases to be equal to or lower than the required pivoting angle.

The description above is merely illustrative of the technical idea of the present disclosure. Various modifications and changes may be made by those having ordinary skill in the art without departing from the essential characteristics of the present disclosure.

Therefore, the embodiments disclosed in the present disclosure are not intended to limit the technical idea of the present disclosure but to illustrate the inventive concept or technical idea. The scope of the technical idea of the present disclosure is not limited by the embodiments. The scope of the present disclosure should be construed as being covered by the scope of the appended claims. All technical ideas falling within the scope of the claims should be construed as being included in the scope of the present disclosure.

The present disclosure induces the difference in the braking force applied to the braking control valves of the tractor and the trailer in the emergency braking situation that occurs during platooning of the trailer vehicle to induce the jackknife phenomenon by the forced pivoting of the trailer. Thereby, additional space for the following vehicle is provided to brake at the rear of the tractor to prevent the occurrence of a collision accident.

In addition, various effects directly or indirectly identified through the present document may be provided.

Hereinabove, although the present disclosure has been described with reference to several embodiments and the accompanying drawings, the present disclosure is not limited thereto. The embodiments and the disclosure may be variously modified and altered by those having ordinary skill in the art to which the present disclosure pertains without departing from the spirit and scope of the present disclosure claimed in the following claims.

What is claimed is:

1. A device for controlling collision avoidance of a trailer vehicle in platooning, the device comprising:
   a memory storing program instructions; and
   a processor configured to execute the program instructions, the program instructions when executed configured to
      determine whether to execute jackknife induction control in a leading vehicle when an emergency braking situation occurs during the platooning of the trailer vehicle with a trailer coupled to a tractor, and
      provide an additional braking distance to a following vehicle at a rear of the tractor by inducing pivoting of the trailer while controlling the tractor and the trailer of the leading vehicle, respectively, to cause a jackknife phenomenon.

2. The device of claim 1, wherein the processor is configured to
   determine whether to perform maximum emergency braking by comparing an actual distance between a front object and the leading vehicle recognizing a presence of the front object with a minimum braking distance at a time when executing emergency braking of the leading vehicle;
   transmit an emergency braking command from the leading vehicle executing the maximum emergency braking to the following vehicle to induce emergency braking of the following vehicle; and
   receive a jackknife execution request for securing the additional braking distance transmitted from the following vehicle to determine to execute the jackknife induction control.

3. The device of claim 2, wherein the processor is configured to receive the jackknife execution request based on a determination that a minimum braking distance of the following vehicle is greater than an actual distance between the leading vehicle and the following vehicle.

4. The device of claim 1, wherein the processor is configured to:
   determine a pivoting induction direction by selecting a lane to be entered by the trailer bending by the jackknife phenomenon among lanes on both sides of the leading vehicle in the platooning; and
   reduce a braking force of a trailer braking control valve on a pivoting induced-side to cause a difference in the braking force, thereby inducing pivoting of the trailer in the pivoting induction direction to cause the jackknife phenomenon.

5. The device of claim 4, wherein the processor is configured to:
   reduce a braking force of a left braking control valve among braking control valves of the trailer to induce pivoting in a clockwise direction when the pivoting induction direction is a direction toward a left lane; and
   reduce a braking force of a right braking control valve to induce pivoting in a counterclockwise direction when the pivoting induction direction is a direction toward a right lane.

6. The device of claim 4, wherein the processor is configured to apply a control command for reducing a braking force of a side opposite to the pivoting induced-side to a braking control valve of the tractor to induce pivoting in a direction opposite to the pivoting induction direction of the trailer to the tractor when it is determined that the trailer vehicle is traveling on a straight road.

7. The device of claim 4, wherein the processor is configured to apply a control command for reducing a braking force of a side opposite to the pivoting induced-side to a braking control valve of the tractor to induce pivoting in a direction opposite to the pivoting induction direction of the trailer to the tractor when the trailer vehicle is traveling on a curve, and the curve and the pivoting induction direction are directed to different sides.

8. The device of claim 4, wherein the processor is configured to perform control to maintain a turning range of the tractor within a limit yaw rate range by reducing a difference in a braking force of the tractor when a sensed yaw rate indicating a turning degree of the tractor is out of the preset limit yaw rate range.

9. The device of claim 8, wherein the processor is configured to reduce the difference in the braking force by increasing a braking force of a braking control valve on a side where the braking force was reduced and decreasing a braking force of a braking control valve on a side where the braking force was maintained when the sensed yaw rate deviates from the limit yaw rate range.

10. The device of claim 4, wherein the processor is configured to perform control to maintain a pivoting angle of the trailer within a required pivoting angle range by reducing the difference in the braking force applied to the braking control valves of the trailer when the pivoting angle of the trailer is beyond the preset required pivoting angle range.

11. The device of claim 10, wherein the processor is configured to:
   increase the braking force on the pivoting induced-side where the braking force was reduced to induce the pivoting of the trailer; and
   reduce a braking force on a side opposite to the pivoting induced-side where a braking force during the emergency braking was maintained to reduce a pivoting degree of the trailer.

12. The device of claim 4, wherein processor is configured to control braking forces of braking control valves of the tractor and the trailer to increase or decrease such that a sensed yaw rate of the tractor measured by a yaw rate sensor is maintained within a preset limit yaw rate range until the trailer vehicle stops, and such that a pivoting angle of the trailer measured based on an image filmed by a cab rear camera is maintained within a preset range of a required pivoting angle.

13. The device of claim 12, wherein the processor is configured to:
   perform control to reduce a difference in the braking force of the tractor when the sensed yaw rate increases beyond the limit yaw rate range, and to increase the difference in the braking force when the sensed yaw rate decreases to be below the limit yaw rate range; and
   perform control to reduce the difference in the braking force of the trailer when the pivoting angle of the trailer increases to be equal to or higher than the required pivoting angle, and to increase the difference in the braking force when the pivoting angle of the trailer decreases to be equal to or lower than the required pivoting angle.

14. A method for controlling collision avoidance of a trailer vehicle in platooning, the method comprising:
   a jackknife induction determination operation for determining whether to execute jackknife induction control in a leading vehicle when an emergency braking situation occurs during the platooning of the trailer vehicle with a trailer coupled to a tractor; and a jackknife induction control operation for providing an additional braking distance to a following vehicle at the rear of the tractor by inducing pivoting of the trailer while controlling the tractor and the trailer of the leading vehicle, respectively, to cause a jackknife phenomenon when it is determined to execute the jackknife induction control.

15. The method of claim 14, wherein the jackknife induction control operation includes:

a pivoting induction direction determining process for determining a pivoting induction direction by selecting a lane to be entered by the trailer bending by the jackknife phenomenon among lanes on both sides of the leading vehicle in the platooning; and a trailer pivoting induction process for reducing a braking force of a trailer braking control valve on a pivoting induced-side to cause a difference in the braking force, thereby inducing pivoting of the trailer in the pivoting induction direction to cause the jackknife phenomenon.

16. The method of claim 15, wherein the trailer pivoting induction process includes:

reducing a braking force of a left braking control valve among braking control valves of the trailer to induce pivoting in a clockwise direction when the pivoting induction direction is a direction toward a left lane; and reducing a braking force of a right braking control valve to induce pivoting in a counterclockwise direction when the pivoting induction direction is a direction toward a right lane.

17. The method of claim 15, wherein the trailer pivoting induction process includes:

applying a control command for reducing a braking force of a side opposite to the pivoting induced-side to a braking control valve of the tractor to induce pivoting in a direction opposite to the pivoting induction direction of the trailer to the tractor when it is determined that the trailer vehicle is traveling on a straight road.

18. The method of claim 15, wherein the jackknife induction control operation further includes:

a tractor monitoring process for performing control to maintain a turning range of the tractor within a limit yaw rate range by reducing a difference in a braking force of the tractor when a sensed yaw rate indicating a turning degree of the tractor is out of the preset limit yaw rate range.

19. The method of claim 15, wherein the jackknife induction control operation further includes:

a trailer pivoting monitoring process for performing control to maintain a pivoting angle of the trailer within a required pivoting angle range by reducing the difference in the braking force applied to the braking control valves of the trailer when the pivoting angle of the trailer is beyond the preset required pivoting angle range.

20. The method of claim 15, wherein the jackknife induction control operation further includes:

a feedback controlling process for performing control to reduce a difference in a braking force of the tractor when a sensed yaw rate increases beyond a limit yaw rate range, and to increase the difference in the braking force when the sensed yaw rate decreases to be below the limit yaw rate range, and performing control to reduce the difference in the braking force of the trailer when a pivoting angle of the trailer increases to be equal to or higher than a required pivoting angle, and to increase the difference in the braking force when the pivoting angle of the trailer decreases to be equal to or lower than the required pivoting angle.

* * * * *